United States Patent
Ouyang et al.

(10) Patent No.: US 7,019,437 B2
(45) Date of Patent: Mar. 28, 2006

(54) HIGH-EFFICIENCY PIEZOELECTRIC SINGLE-PHASE UNI-POLAR ULTRASONIC ACTUATORS WITH A NOTCHED PZT BACK DISC

(75) Inventors: Min-Shen Ouyang, Hsinchu (TW); Swe-Kai Chen, No. 73, East Village, National Tsing-Hua University, Kuang-Fu Road, Sec.2, Hsinchu (TW)

(73) Assignee: Swe-Kai Chen, Hsinchu (TW)

( * ) Notice: Subject to any disclaimer, the term of this patent is extended or adjusted under 35 U.S.C. 154(b) by 217 days.

(21) Appl. No.: 10/653,963

(22) Filed: Sep. 4, 2003

(65) Prior Publication Data

US 2005/0052093 A1   Mar. 10, 2005

(51) Int. Cl.
   *H02N 2/00*   (2006.01)
(52) U.S. Cl. .................... 310/323.08; 310/312
(58) Field of Classification Search ............. 310/311, 310/312, 327, 328, 323.08
   See application file for complete search history.

(56) References Cited

U.S. PATENT DOCUMENTS

| | | | | |
|---|---|---|---|---|
| 4,156,156 A | * | 5/1979 | Sweany et al. | 310/312 |
| 5,128,581 A | * | 7/1992 | Nakayama et al. | 310/329 |
| 5,237,237 A | * | 8/1993 | Ueda et al. | 310/323.08 |
| 5,376,853 A | * | 12/1994 | Fushimi | 310/312 |
| 6,166,477 A | * | 12/2000 | Komoda et al. | 310/323.13 |
| 6,798,118 B1 | * | 9/2004 | Wen | 310/323.02 |
| 6,933,657 B1 | * | 8/2005 | Maruyama et al. | 310/328 |
| 2003/0006674 A1 | * | 1/2003 | Ouyang et al. | 310/326 |

FOREIGN PATENT DOCUMENTS

| | | | | |
|---|---|---|---|---|
| JP | 59-092699 | * | 5/1984 | |
| JP | 61-135369 | * | 12/1984 | 310/311 |
| JP | 63-224679 | * | 9/1988 | 310/311 |
| JP | 2-84083 | * | 3/1990 | 310/311 |
| JP | 9-47048 | * | 2/1997 | |

\* cited by examiner

*Primary Examiner*—Thomas M. Dougherty
(74) *Attorney, Agent, or Firm*—Rosenberg, Klein & Lee

(57) ABSTRACT

Disclosed herein is a high efficiency piezoelectric single phase uni-polar supersonic actuator which is composed of an upper back disc, a PZT plate an electrode, a lower back disc, a pivotal bolt and a fixing nut. The PZT plate and its electrode are interposed between the upper and the lower back discs, and the whole actuator unit is supported and fixed with the pivotal bolt and the nut combination by passing the bolt coaxially through the center of the actuator unit. The parametric output variation of the actuator is carried out by an asymmetrical structure due to varying number, size and location of notches, or a variety of notch and screw combination made on the upper back disc such that after the electrode is energized, the actuator produces an unbalanced periodic axial or transverse thrust force to drive a rotor installed on the pivotal bolt above the upper back disc. The maximum rotating speed of the rotor may reach up to above 3000 rpm.

7 Claims, 7 Drawing Sheets

HIGH-EFFICIENCY PIEZOELECTRIC SINGLE-PHASE UNI-POLAR ULTRASONIC ACTUATORS WITH A NOTCHED PZT BACK DISC

BACKGROUND OF THE INVENTION

1. Field of the invention

The present invention relates to a piezoelectric single phase uni-polar ultrasonic actuator, particularly to a uni-polar ultrasonic actuator that has a PZT ($Pb(Zr_{0.52},Ti_{0.48})O_3$) plate and an upper back disc with several combinations of notch and/or screw thereon, so as to enable the actuator to operate at a single phase in an ultrasonic frequency range with a high efficient output.

2. Description of the Prior Art

FIG. 1 shows the structure of a conventional ultrasonic piezoelectric actuator. As can be seen, the structure in FIG. 1 consists of a circular disc shaped piezoelectric vibrator plate 1 as a driving member. This piezoelectric plate 1 is essentially a metallic back disc 11 made of nickel alloy on which a PZT plate 12 formed of PZT is adhered. The electrode unit 13 on the disc is divided in two electrodes 131 and 132 driven by two driving circuits respectively. As soon as an ultrasonic sinusoidal voltage is applied to PZT plate 12, the PZT plate 12 and its associated metallic back disc 111 vibrate with a high frequency. The energy thereof is transmitted sinusoidally with an amplitude in the range of μms controlled according to the strength of the input voltage. By so the structure is able to serve as a precise actuator. But a conventional PZT actuator constructed as such has several inherent disadvantages:

1. The fixed unadjustable output limits its application field.
2. An extra cost is required for dividing the electrode unit in two.
3. The PZT plate formed of $PbTiO_3$ or $PbZrO_3$ is very fragile.

It is what the reason the inventor has endeavored for years of continuous research and experimentation attempting to find out the remedy to palliate the inherent shortcomings of the conventional techniques described above, and at last has succeeded in realizing the present invention.

SUMMARY OF THE INVENTION

Accordingly, the first objective of the present invention is to provide a piezoelectric single phase uni-polar ultrasonic actuator that has an upper back disc with several notch-screw combinations provided thereon so as to enable the actuator to operate in an ultrasonic frequency range with an efficient output.

The second objective of the present invention is that the parametric output variation of the actuator can be carried out by varied number of notches, their sizes, and location or a variety of notch and screw combinations made on the upper back disc.

The third objective of the present invention is that the actuator is provided only one electrode so as to curtail its manufacturing cost yet still applicable to a wide industrious field.

To achieve these objectives described above, the PZT ultrasonic actuator of the present invention is composed of an upper back disc, a PZT plate, an electrode, a lower back disc, and a pivotal bolt and nut combination. The PZT plate and its electrode are interposed between the upper and the lower back discs, and the whole unit is supported and fixed by the pivotal blot and nut combination by passing the bolt coaxially through the center of the unit and then fixed with the nut. The parametric variation in output of the actuator is carried out through an asymmetrical structure by varying number of notches, their sizes and locations, or a variety of notch and/or screw combinations on the upper back disc such that the actuator produces an unbalanced periodic axial or transverse thrust force to drive the rotor installed on the same pivotal axis above the upper back disc.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE PREFERRED EMBODIMENT

Figure 1:
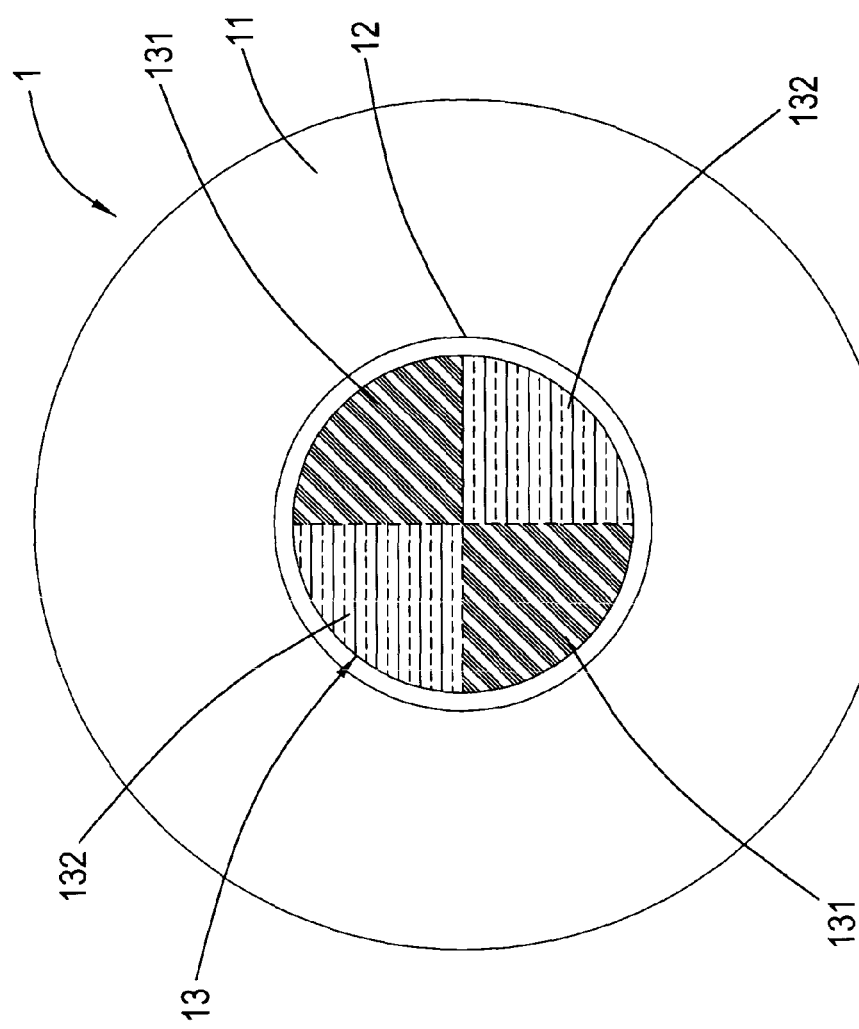
FIG. 1 is a schematic view showing the structure of a conventional ultrasonic piezoelectric actuator.
Figure 2:
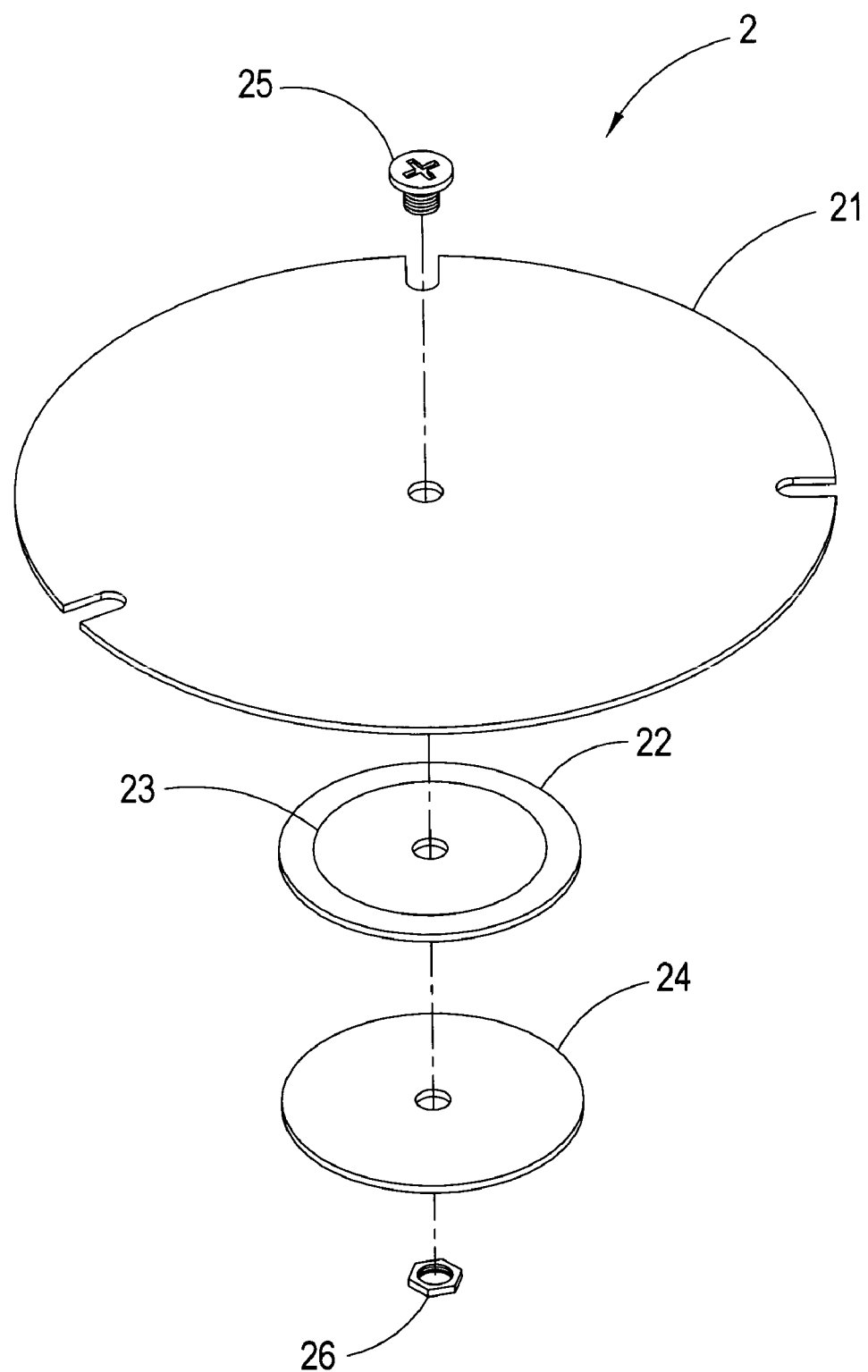
FIG. 2 is an exploded view of the PZT single phase uni-pole ultrasonic actuator of the present invention.
Figure 3:
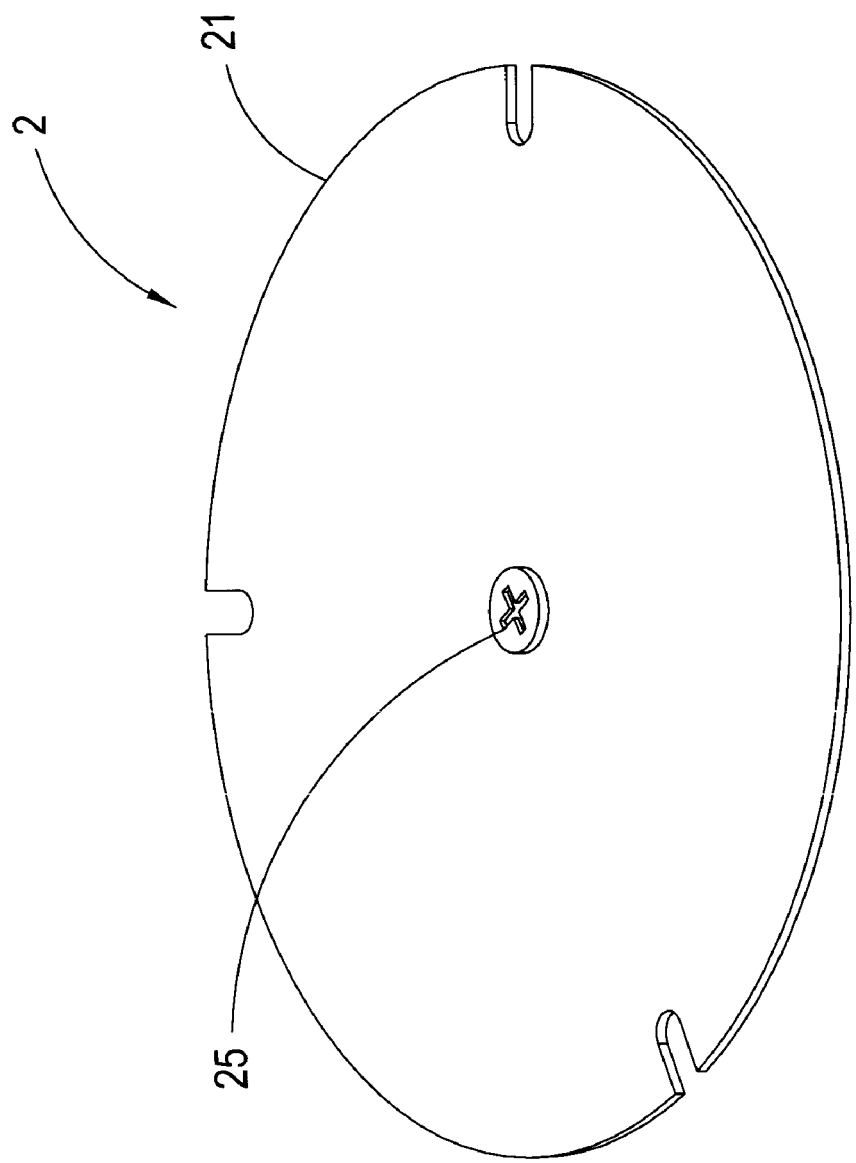
FIG. 3 is an assembled view of FIG. 2.

Referring to FIGS. 2 and 3, the PZT single phase uni-polar ultrasonic actuator 2 of the present invention is composed of an upper back disc 21, a PZT plate 22, an electrode 23, a lower back disc 24, a pivotal bolt 25, and a nut 26. The PZT plate 22 and its electrode 23 are interposed between the upper and the lower back discs 21 and 24, and the whole actuator unit is then supported and fixed with the pivotal bolt 25 and the nut 26 combination by passing the bolt 25 coaxially through the center of the unit. The parametric output variation of the actuator 2 is carried out by an asymmetrical structure due to varying number, size and location of notches 211 thereof, or a variety of notch and screw combination made on the upper back disc 23 such that after the electrode 23 is energized, the actuator 2 produces an unbalanced periodic axial or transverse thrust force to drive a rotor 4 installed on the pivotal blot 25 above the upper back disc 21. The maximum rotating speed of the rotor 4 may reach up to above 3000 rpm.

Figure 4A:
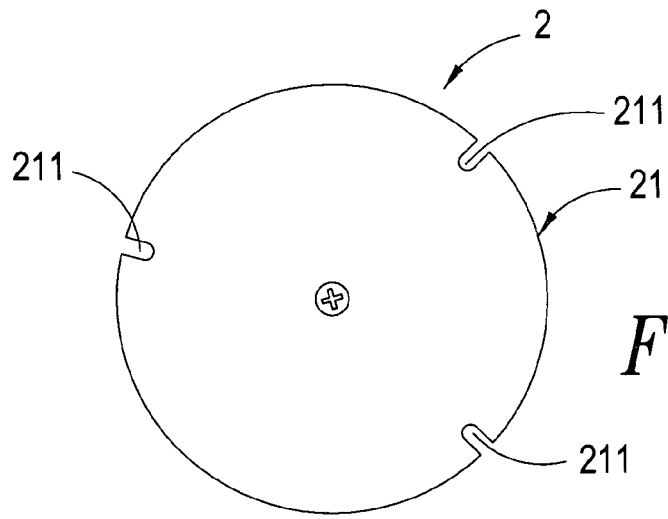
FIGS. 4(a)~4(c) show a notched (a), a screw equipped (b), and a combination of screw and notch equipped (c) upper disc of the present invention respectively.
Figure 4B:
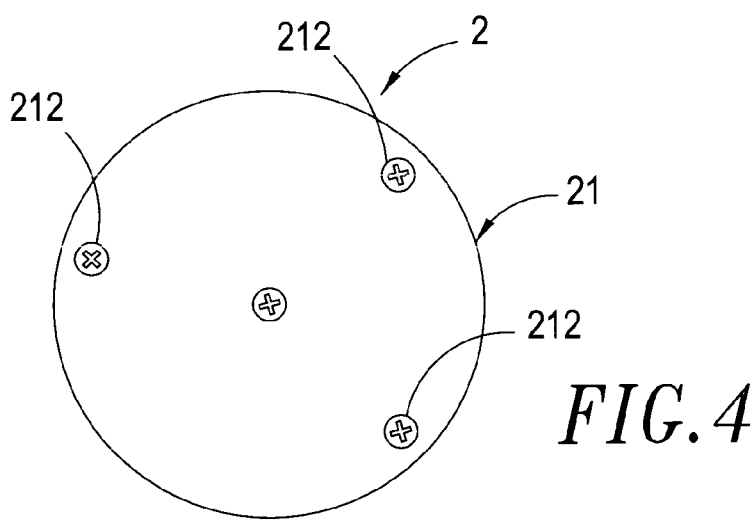
Figure 4C:
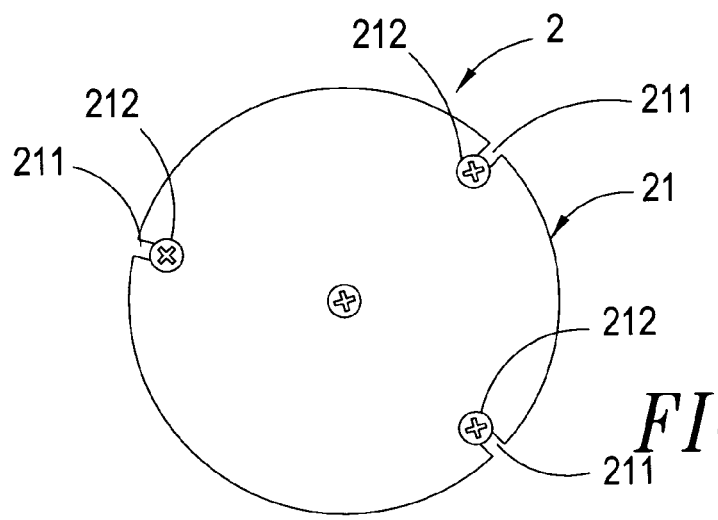

Referring to FIGS. 4(a) to 4(c), in which three notches (see 4(a)), three screws (see 4(b)), and three notches each associated with a screw (see 4(c)) are provided along the edge of the upper back disc 21 respectively. The angular separation between adjacent notches 211 screws 212, and notch 211 and screw 212 combination is 90-120-150, or 100-120-140 degree so as to give the upper back disc an asymmetric structure thereby causing the actuator 2 to produce an unbalanced periodic output.

Figure 5:
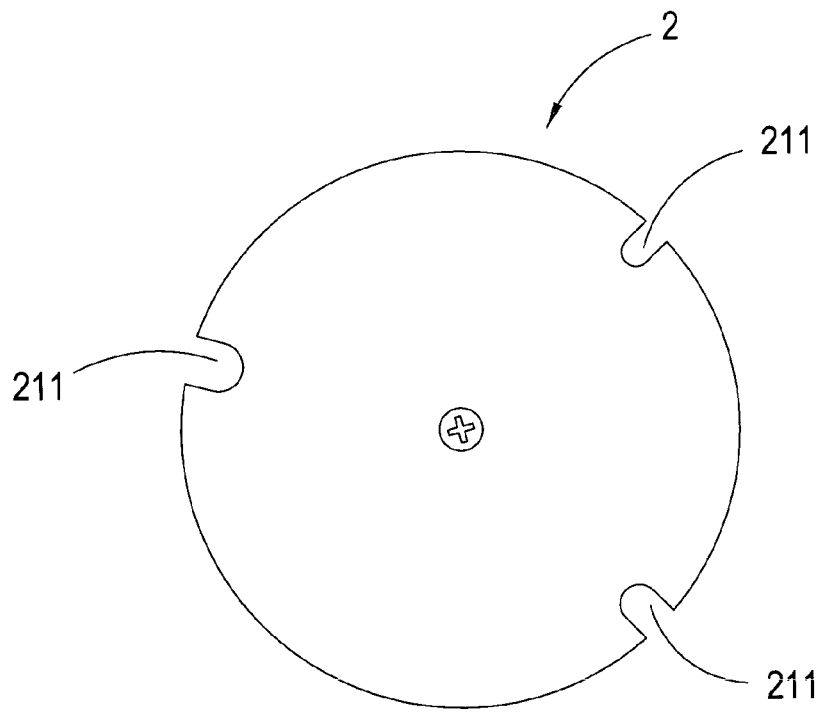
FIGS. 5(a)~5(b) show respectively the structures of two upper discs whereon notches of different sizes and shapes are formed, by doing so, the rotor of the actuator is able to rotate up to 3000 rpm.
Figure 5:
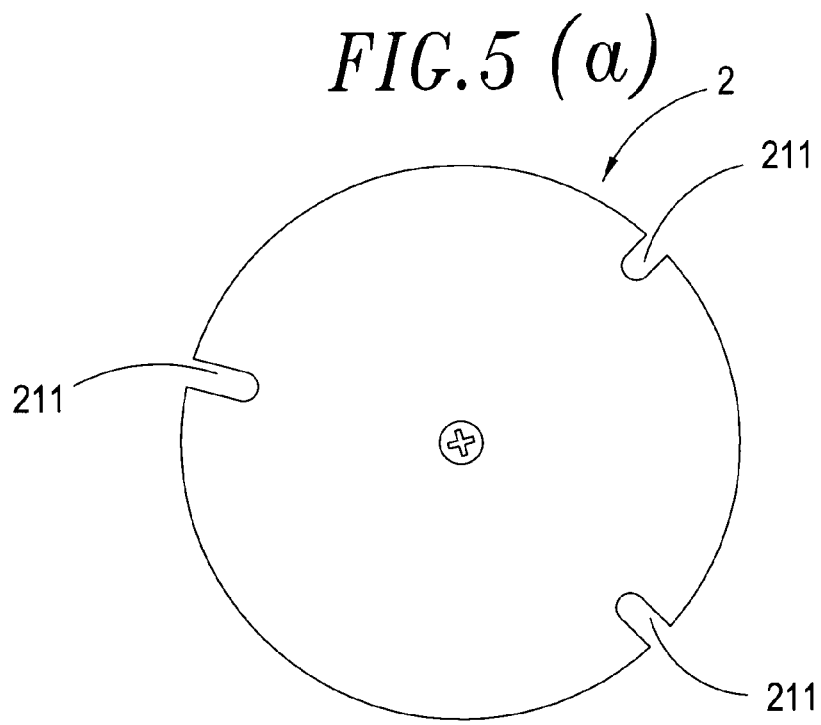

Referring to FIGS. 5(a) and 5(b), the output of the actuator 2 may be parametrically varied by varying the sizes, including width and depth, of the notches 211 to obtain an optimistic output effect of the actuator 2.

Figure 6:
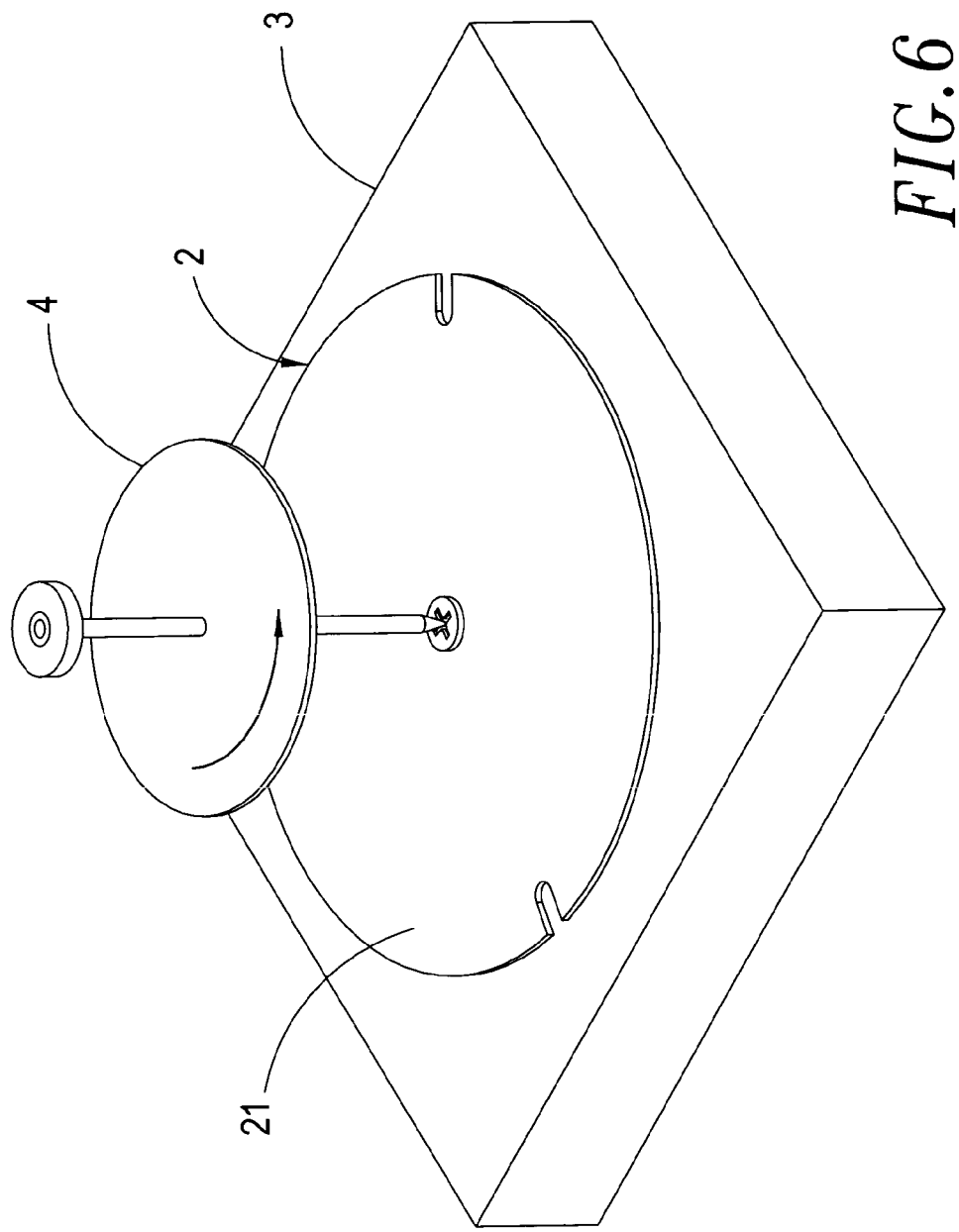
FIG. 6 is an embodiment of the present invention.

Referring to FIG. 6, in an embodiment of the present invention, the PZT actuator 2 is placed on a base 3 to operate. As it has been described above, the parametric output variation of the actuator 2 is carried out by an asymmetrical structure due to varying number, size, and location of notches 211, or a variety of notch 211 and screw 212 combination made on the upper back disc 21 installed on the base 3. After the electrode 23 is energized, the actuator 2 produces an unbalanced periodic axial or transverse thrust to drive the rotor 4 installed on the pivotal bolt 25 above the upper back disc 21. In this embodiment, the preferable angular separation of the three notches 211 is 90-120-150 degree.

Figure 7:
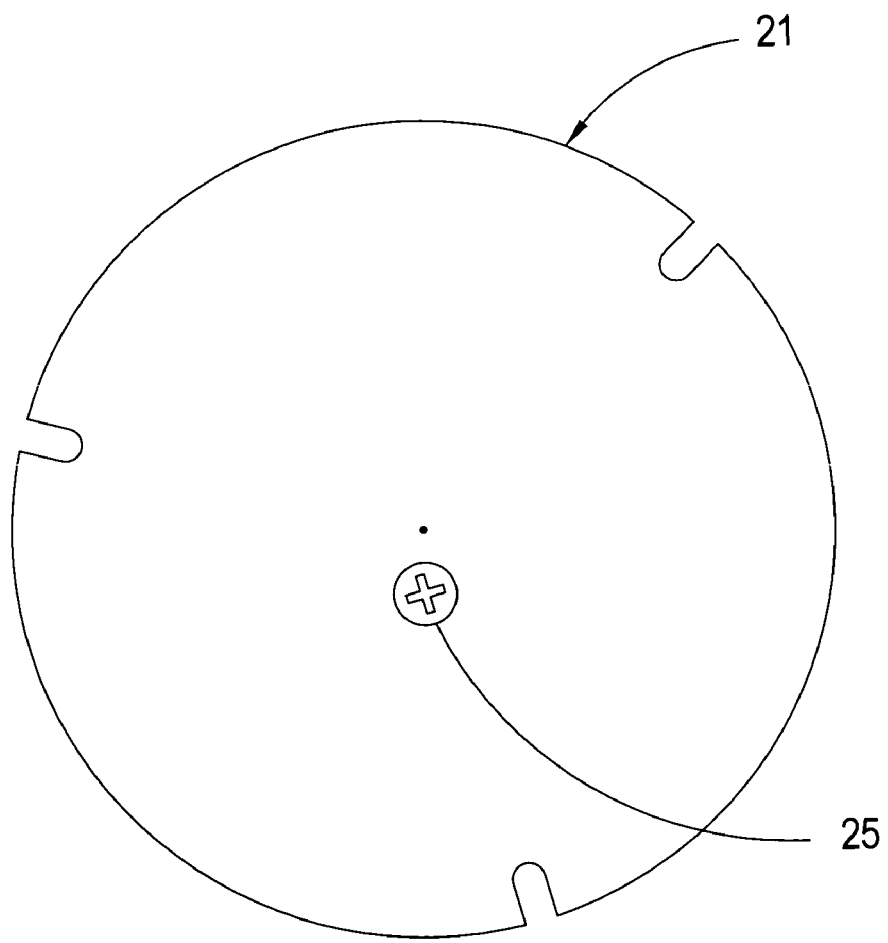
FIG. 7 is another embodiment of the present invention.

Referring to FIG. 7, in the second embodiment of the present invention, the three notches 211 (they may be replaced with three corresponding screws or three notches each associated with a screw) are separated 120-120-120 degree. In this case the aforesaid output effect can be attained by installing the pivotal bolt 25 eccentrically.

In short, it emerges from the description of the above examples that the invention has several noteworthy advantages, in particular:

1.Easy and simple parametric variation can be used to adjust the output of the actuator to an optimistic value.

2.As the output of the actuator can be easily controlled, this versatile actuator is applicable widely to many industry and production field.

3.Because of its simple uni-polar construction, this actuator can be fabricated with very low cost, but can operate with a high efficiency for long time duration without the fear of overheating or breakdown.

4.The diameter of the PZT plate and the back discs, and the distance from the pivotal bolt to the driving point are variable, and the direction of the driving force may be axial, or transverse, or combination of the two. The pivotal bolt is formed of friction resistant hardened chromium.

Although the description above contains many specifications, these should not be construed as limiting the scope of the invention but as merely providing illustration of some of the presently preferred embodiments of this invention. Thus the scope of the invention should be determined by the appended claims and their legal equivalents rather than by the examples given.

What is claimed is:

1. A high efficiency piezoelectric single phase uni-polar ultrasonic actuator comprising:
    an upper and lower pair of back discs,
    a PZT plate interposed between said upper and lower back discs,
    an electrode formed on said PZT plate,
    a pivotal bolt extending through said upper and lower pair of back discs, and said PZT plate, and
    a fixing nut secured to one end of said pivotal bolt, said actuator unit is being supported and fixed with said pivotal bolt and said fixing nut combination by passage of said pivotal bolt coaxially through the center of said actuator unit wherein parametric output variation of said actuator is carried out by asymmetrizing the structure of said actuator by a formation of at least one straight notch having a screw coupled to said upper disc within said notch on an edge of said upper disc such that after said electrode being energized, said actuator produces an unbalanced periodic output force.

2. The actuator as in claim 1, wherein said parametric output variation is carried out by varying number, size (including width and depth), and a location of notch and screw combinations made along the edge of said upper disc.

3. The actuator as in claim 1, wherein the diameter of said PZT plate and said back discs, and the distance from said pivotal bolt to a driving point are variable, said pivotal bolt is formed of friction resistant hardened chromium, and the direction of a driving force is axial, or transverse, or combination of the two.

4. A high efficiency piezoelectric single phase uni-polar ultrasonic actuator comprising:
    an upper and lower pair of back discs,
    a PZT plate interposed between said upper and lower back discs,
    an electrode formed on said PZT plate,
    a pivotal bolt extending through said upper and lower pair of back discs, and said PZT plate, and
    a fixing nut secured to one end of said pivotal bolt, said actuator unit is being supported and fixed with said pivotal bolt and said fixing nut combination by passage of said pivotal bolt eccentrically through a portion of said actuator unit wherein parametric output variation of said actuator is carried out by asymmetrizing the structure of said actuator by a formation of at least one straight notch having a screw coupled to said upper disc within said notch on an edge of said upper disc such that after said electrode being energized, said actuator produces an unbalanced periodic output force.

5. The actuator as in claim 4, wherein said parametric output variation is carried out by a varying number, size (including width and depth), and a location of said at least one straight notch and screw combination made along the edge of said upper disc.

6. The actuator as in claim 4, wherein said at least one straight notch and screw combination are separated with an equal angular distance.

7. The actuator as in claim 4, wherein the diameter of said PZT plate and said back discs, and the distance from said pivotal bolt to a driving point are variable, said pivotal bolt is formed of friction resistant hardened chromium, and the direction of a driving force is axial, or transverse, or combination of the two.

* * * * *